United States Patent [19]

Chand

[11] Patent Number: 5,159,547

[45] Date of Patent: Oct. 27, 1992

[54] SELF-MONITORING TUNER FOR FEEDBACK CONTROLLER

[75] Inventor: Sujeet Chand, Camarillo, Calif.

[73] Assignee: Rockwell International Corporation, Seal Beach, Calif.

[21] Appl. No.: 598,488

[22] Filed: Oct. 16, 1990

[51] Int. Cl.$^5$ .............................................. G05B 13/02
[52] U.S. Cl. ...................................... 364/157; 364/162
[58] Field of Search .............. 364/157, 159, 151, 150, 364/148, 149, 152, 159, 162

[56] References Cited

U.S. PATENT DOCUMENTS

| | | | |
|---|---|---|---|
| 4,549,123 | 10/1985 | Hägglund et al. | 318/610 |
| 4,675,805 | 6/1987 | Freymann | 364/162 |
| 4,860,215 | 8/1989 | Seraji | 364/513 |
| 4,903,192 | 2/1990 | Saito et al. | 364/157 |

OTHER PUBLICATIONS

Anderson et al., "A Rule-Based Adaptive PID Controller," Proc. 1988 IEEE Conf. on Decision and Control, pp. 564–569, Austin, Texas, 1988.

*Primary Examiner*—Jerry Smith
*Assistant Examiner*—Patrick D. Muir
*Attorney, Agent, or Firm*—John C. McFarren

[57] ABSTRACT

An automatic tuner is provided for continuous, on-line tuning of proportional, integral, and derivative (PID) feedback controllers. The tuner compares the system input signals with the system response to generate estimates of system damping, frequency, and steady-state error, and then applies a set of if-then rules derived from mathematical and/or empirical analysis of the system parameters. The tuner represents each parameter of the rule-set by a "fuzzy" membership function, and an inference mechanism uses fuzzy logic for computing system outputs from the input values. The tuner also incorporates a self-monitoring mechanism to adjust the tuner output based on past performance. At each running cycle, the tuner computes a Euclidean distance between present values and desired values in the parameter-space represented by damping, frequency, and steady-state error. The output of the tuner is then scaled by a "reward factor" that is a function of the tuner effectiveness and consistency. If tuner effectiveness degrades, the self-monitoring mechanism diminishes the output of the tuner. If the tuner is operating with consistency, the self-monitoring mechanism increases the output of the tuner. Thus, the self-monitoring mechanism improves performance and robustness of the tuner by scaling the output to produce faster slew rates when the tuner is performing well and by reducing tuner output when performance is poor.

10 Claims, 3 Drawing Sheets

SELF-MONITORING TUNER FOR FEEDBACK CONTROLLER

TECHNICAL FIELD

The present invention relates to feedback control systems for dynamic processes and, in particular, to a continuous, on-line, self-monitoring tuner for a proportional, integral, and derivative (PID) controller of a system having a time-varying or nonlinear transfer function.

BACKGROUND OF THE INVENTION

Proportional, integral, and derivative (PID) controllers are commonly used for feedback control of dynamic systems, such as for regulating temperature in chemical processes and speed in servo motors. PID controllers provide three gain values: proportional gain, derivative gain, and integral gain. Good closed-loop performance of a controlled system is achieved by appropriate selection of these gain values, which are functions of the system's input-output tranfer function.

In the prior art, PID tuners incorporate either conventional control theory or intelligent control techniques, such as expert systems and fuzzy logic. Conventional control theory requires a priori knowledge of the dynamics of the controlled system. In many real-world systems, however, the controlled parameters change over time as a result of factors such as frictional wear, aging of components, and variations in temperature and pressure. In such time-varying or nonlinear processes, traditional non-adaptive control techniques do not correct for variations in system parameters. As a result, system response degrades with time because control is based on a predetermined model of the system that becomes outdated. Response degradation is particularly undesirable for systems that must perform reliably under extreme environmental conditions, or with high duty cycles, or where manual adjustments may not be immediately available.

Adaptive control techniques based on conventional control theory are well-known for tuning slowly varying systems where the coefficients of the system transfer function remain within prescribed bounds. However, conventional control theory can not provide stable tuning algorithms to compensate for changes in the order or structure of the system model caused, for example, by excitation of unmodeled modes in the dynamic system. On the other hand, control techniques based on expert systems can require a large number of rules for precise tuning under various changes in the system dynamics.

Fuzzy logic has also been applied to PID controller systems, as described in U.S. Pat. No. 4,903,192 issued to Saito et al. Fuzzy inferencing is based on a set of rules or heuristics, as in expert systems, but it also provides the ability to interpolate between the rules. This is important because a fundamental problem for PID tuners is the deleterious effect of incorrect rules or heuristics. A rule or heuristic may be correct initially, but as the system dynamics change over time the same rule or heuristic may become invalid or incorrect. Therefore, to maintain a desired level of performance in time-varying and nonlinear systems, the PID controller gains must be adapted to changes in the system parameters.

In prior art PID tuners, no provision has been made for checking the validity of the heuristics during operation. As a result, the fixed input-output mapping used by prior art fuzzy logic or expert systems is effective for tuning only a small class of time-varying dynamic systems. A capability for stable and effective tuning of a large class of dynamic systems, however, requires self-monitoring and on-line adaptation to unmodeled system modes. Thus, there is a need for an automatic tuner that continuously monitors the input and output of the controlled system, determines the appropriate gain values of the PID controller, and provides on-line compensation for parameter variations or model changes as they occur in the system.

SUMMARY OF THE INVENTION

The present invention comprises an automatic tuner for feedback controllers, such as proportional, integral, and derivative (PID) controllers. The tuner of the present invention incorporates features for self-monitoring and on-line adaptation to avoid catastrophic behavior in time-varying dynamic systems. The tuner compares the signals input to the controlled system with the output response to generate an estimate, or system model, of output parameters such as rise time, overshoot, settling time, damping, frequency, and steady-state error. The tuner uses specified if-then rules based on a minimum set of variables, such as the estimates of system damping, frequency, and steady-state error. The set of if-then rules can be derived from a mathematical analysis of the sensitivity of the system to variations in controller gain and/or from prior experience of system response to changes in controller gain. These internal heuristics are continuously monitored by a Lyapunov function in the state-space of the tuner.

The tuner of the present invention represents each parameter of the rule-set by a "fuzzy" membership function, and an inference mechanism uses fuzzy logic for computing tuner output from the input values. The use of fuzzy logic provides continuous gain values rather than the discrete values generated by conventional expert systems.

In conventional fuzzy logic controllers or expert systems based on heuristics, there is no provision for identifying failure of the heuristics in time to instigate corrective action and avoid catastrophic behavior. In contrast, the tuner of the present invention incorporates a self-monitoring mechanism that adjusts the tuner output based on past performance. At each tuning cycle, the tuner computes a Euclidean distance between present values and target values in the parameter-space represented by damping, frequency, and steady-state error. The output of the tuner is then scaled by a "reward factor" to adjust the tuner output based on prior performance.

The reward factor is a function of tuner effectiveness and consistency. Tuner "effectiveness" is defined as the difference between successive distances to the target values divided by a moving average of the incremental distance. If tuner effectiveness degrades, the reward factor decreases and the self-monitoring mechanism diminishes the output of the tuner. If the tuner is operating with "consistency," which is defined as a function of the variance in effectiveness in the preceding three tuning cycles, the reward factor increases and the self-monitoring mechanism boosts the output of the tuner. Thus, the self-monitoring mechanism improves the performance and robustness of the tuner by reducing tuner output in response to poor performance and by scaling the output to produce even faster slew rates in response to good performance. The continuous scaling of the tuner output by the reward factor provides high performance for a conservative tuner design based on robust heuristics.

BRIEF DESCRIPTION OF THE DRAWINGS

For a more complete understanding of the present invention and for further advantages thereof, the following Detailed Description of the Preferred Embodiment makes reference to the accompanying Drawings, in which.

DETAILED DESCRIPTION OF THE PREFERRED EMBODIMENT

Figure 1:
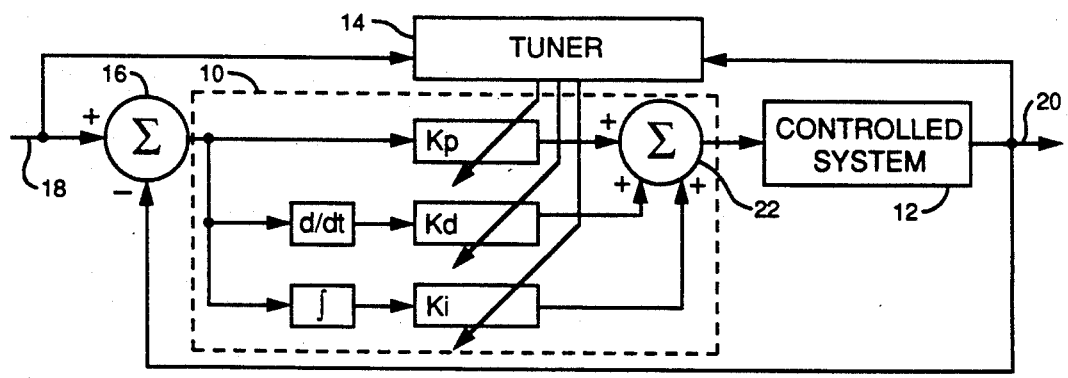
FIG. 1 is a schematic block diagram of a PID controller and an automatic tuner of the present invention.

FIG. 1 is a block diagram of a PID controller 10, which provides feedback control for controlled system 12, and a tuner 14 of the present invention, which provides inputs to controller 10. Tuner 14 determines appropriate values for controller gains $K_p$, $K_d$, and $K_i$ based on its analysis of monitored parameters. Tuner 14 is connected to controller 10 to provide incremental adjustment for gains $K_p$, $K_d$, and $K_i$, as indicated by diagonal arrows passing through the respective gains.

Tuner 14 determines the incremental adjustments to gains $K_p$, $K_d$, and $K_i$, represented by the vector dK, as a function of the transient response characteristics of controlled system 12:

$$dK = \alpha(\text{overshoot, damping ratio, frequency,}$$
$$\text{rise time, settling time, } s - s \text{ error})$$
$$\approx [dK_p \ dK_d \ dK_i]^T,$$

where $\alpha$ is a nonlinear, time-varying function. Determination of $\alpha$ by conventional control theory techniques would require on-line system identification. Most such techniques are computationally complex and limited by rigid assumptions concerning parametric and dynamic uncertainty. In contrast, tuner 14 uses fuzzy logic so that complex functions such as $\alpha$ can be transformed into a fuzzy "domain" and evaluated as compositions of nonlinear input-output set mappings. Fuzzy logic controllers, which are not based on any specific model, are able to tolerate greater system uncertainties.

Figure 2:
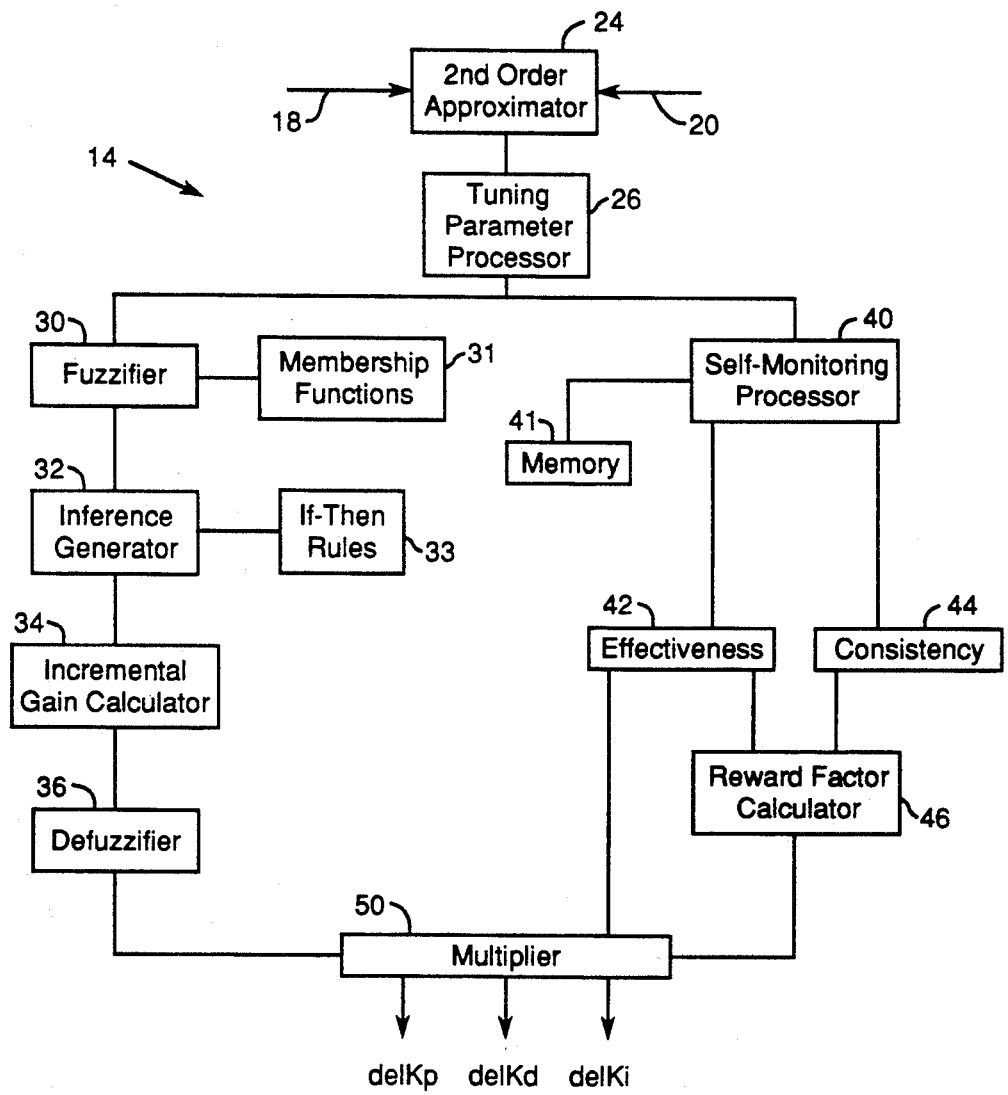
FIG. 2 is a block diagram of the primary functional components of the tuner of the present invention.
Figure 3:
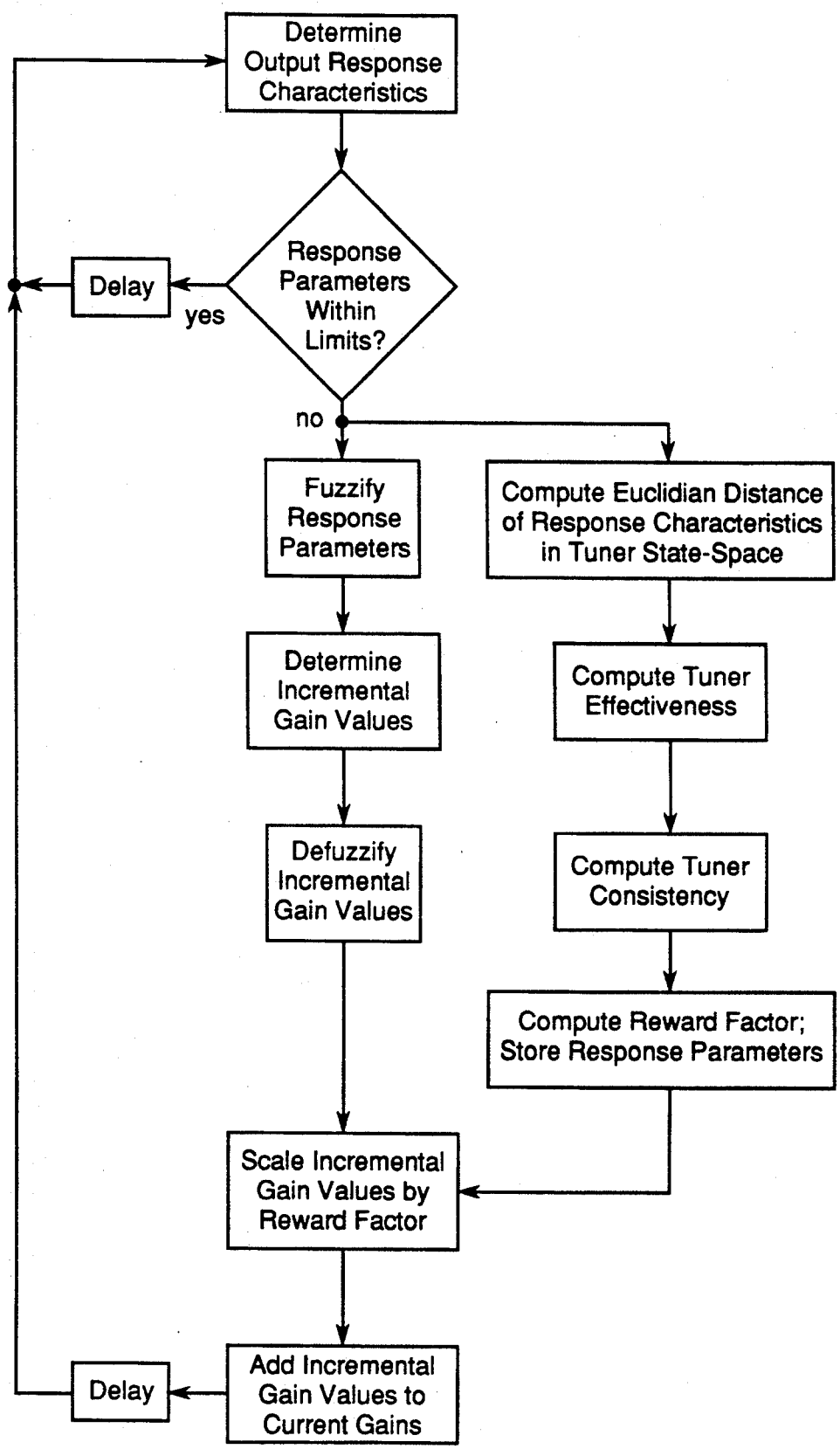
FIG. 3 is a logic flow diagram for the tuner of the present invention.

FIG. 3 (which may be viewed in conjunction with FIG. 2) presents a simplified logic flow diagram of the self-monitoring and gain value adjustment functions of tuner 14. In tuner 14, the first step in using fuzzy logic is termed *fuzzification*, in which input variables (i.e., response parameters of system 12) are transformed into equivalent fuzzy representations. As described below, membership functions are defined for each fuzzy variable. The second step in using fuzzy logic is termed *inferencing*, in which specific if-then rules are executed to determine the incremental gain values. The final step in using fuzzy logic is termed *defuzzification*, in which the fuzzy variables are converted back to numerical values. Thus, a complex nonlinear input-output transformation, such as $\alpha$, can be decoupled into linear, discrete mappings of the input set to the output set in the fuzzy domain. Defuzzification then combines the individual maps created by the rules of the inferencing procedure to generate the incremental gain values adjustments.

A summing junction 16 receives the system input signal 18 as well as the output response 20 of controlled system 12 to generate an error signal for PID controller 10. Controller 10 processes the error signal to generate three values: error multiplied by proportional gain, $K_p$; derivative of error multiplied by derivative gain, $K_d$; and integral of error multiplied by integral gain, $K_i$. These three values are then summed at summing junction 22 and applied to controlled system 12.

In prior art controllers, there is no provision for determining an optimum set of input parameters for a PID controller in a time-varying system. In general, prior controllers use some or all of the response characteristics of rise time, overshoot, settling time, damping ratio, steady-state error, and frequency. However, an ad hoc selection of transient response parameters for the tuner can lead to conflicting rules or objectives because the transient response parameters are not all independent of each other. For example, overshoot and rise time are functions of damping. Therefore, it is important that the input parameters of a PID tuner be carefully selected.

Tuner 14 determines a fixed, minimal set of tuning parameters, based on an approximation of the system model, so that conflicting objectives are avoided. By activating tuner 14 at closely spaced time intervals (e.g., every 250 ms), the transfer function of controlled system 12 can be approximated at each sample time by a second-order time-invariant model. Extensive simulation and testing have shown that the tuner's estimate of the system model will be close to the actual model if the approximations are closely spaced in time. Within this framework, tuner 14 operates with a minimal set of the following three parameters: damping ratio, frequency, and steady-state error. The use of a second-order approximation allows tuner 14 to compute the damping ratio from a single peak in the output response rather than from the synthesis of multiple peaks. Equations for damping, frequency, and steady-state error for second-order approximations are well known in the art and are presented, for example, in K. Ogata, *Modern Control Engineering*, Prentice-Hall (1970). A damping calculation based on multiple peaks, such as described in U.S. Pat. No. 4,903,192, may not be practical for many real systems because multiple peaks are infrequent in a continuous input signal. Such a failure to estimate the input parameters for the tuner can cause divergence of the PID gain values because the tuner will not be able to execute the relevant rules.

Figure 4:
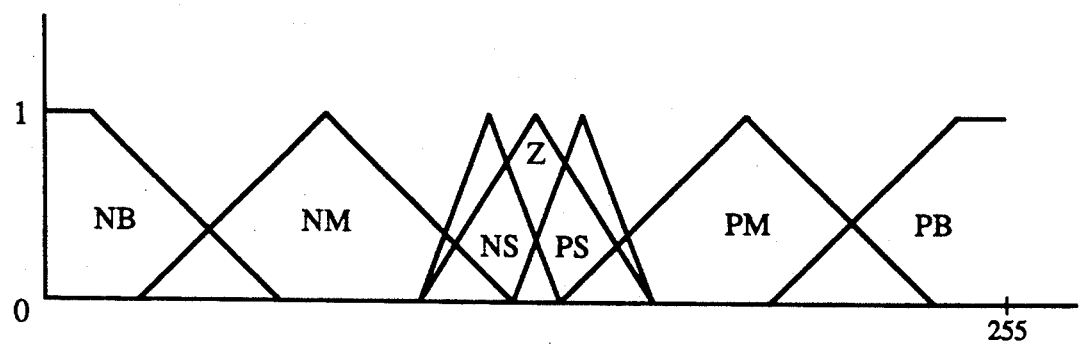
FIG. 4 is a graph of the fuzzy membership functions used by the tuner of the present invention.

A block diagram of the functional components of tuner 14 is illustrated in FIG. 2. Tuner 14 comprises a computer processor that receives signals 18 and 20 as inputs and provides incremental gain adjustments (del$K_p$, del$K_d$, and del$K_i$) to PID controller 10 as its output. A second-order approximator 24 of tuner 14 is connected to receive the system input signal 18 and the output response 20 of system 12. As explained above, approximator 24 provides an estimate of the system model and enables a tuning parameter processor 26 to calculate appropriate values for the tuning parameters. The tuning parameters are input to a fuzzifier 30, which provides the first step in the fuzzy logic process, and to a self-monitoring processor 40. Fuzzy membership functions 31 are defined for each tuning parameter and provided to fuzzifier 30. Typical membership functions 31 are illustrated in FIG. 4. The range of values of the fuzzy variables is normalized as 0 to 255 along the abscissa of the membership function. As illustrated in FIG. 4, there are seven membership functions: Negative Big (NB), Negative Medium (NM), Negative Small (NS), Zero (Z), Positive Small (PS), Positive Medium (PM), and Positive Big (PB). Fuzzy variables that do not have negative values, such as frequency and steady-state error, use only the positive and zero membership functions.

General heuristics for tuner 14 can be derived from a mathematical sensitivity analysis of system transfer functions and/or from actual experience with system behavior. In the preferred embodiment of the present invention, if-then rules 33 are based on the following four general heuristics:

1. If system damping is low, then reduce proportional gain and increase derivative gain.
2. If system damping is high, then increase proportional gain and reduce derivative gain.
3. If steady-state error is high, then increase integral gain.
4. If frequency is high, then reduce integral gain and proportional gain.

These general heuristics can be transformed into sets of if-then rules 33 that comprise instructions used by an inference generator 32 to determine the incremental gain values. In the preferred embodiment, the sets of if-then rules 33 for computing the incremental values of the proportional, integral, and derivative gains are developed as functions of damping ratio, frequency, and steady-state error. After the incremental gain values have been determined, they are converted from their fuzzy state by defuzzifier 36.

In the following set of twenty-three if-then rules 33, an incremental change in a gain value (e.g., "delK$_p$") is determined based on the desired incremental damping (i.e., "delzeta"), the magnitude of the frequency ("freq"), and/or the magnitude of the steady-state error ("sserror"), all expressed in terms of the fuzzy membership functions described above. Rules 33 may be stated as follows:

---
If delzeta is PB, then delK$_p$ is NB.
If delzeta is PB, then delK$_d$ is PB.
If delzeta is PM, then delK$_p$ is NM.
If delzeta is PM, then delK$_d$ is PM.
If delzeta is PS, then delK$_p$ is NS.
If delzeta is PS, then delK$_d$ is PS.
If delzeta is Z, then delK$_p$ is Z.
If delzeta is Z, then delK$_d$ is Z.
If delzeta is NB, then delK$_p$ is PB.
If delzeta is NB, then delK$_d$ is NB.
If delzeta is NM, then delK$_p$ is PM.
If delzeta is NM, then delK$_d$ is NM.
If delzeta is NS, then delK$_p$ is PS.
If delzeta is NS, then delK$_d$ is NS.
If freq is PB, then delK$_i$ is NB.
If freq is PB, then delK$_p$ is NB.
If freq is PM, then delK$_i$ is NM.
If freq is PM, then delK$_p$ is NM.
If freq is PS, then delK$_i$ is NS.
If freq is PS, then delK$_p$ is NS.
If sserror is PB, then delK$_i$ is PB.
If sserror is PM, then delK$_i$ is PM.
If sserror is PS, then delK$_i$ is PS.

---

To implement the foregoing rules, the range of each monitored parameter is mapped into the range of the appropriate incremental gain values. If controlled system 12 is time-varying and nonlinear, the mapped regions vary in real-time as a function of changes in the parameters and the order of the transfer function. The exact membership functions necessary for tuner 14 to be effective for all possible transfer functions in such variable systems are very difficult (if not impossible) to construct. Instead of adaptively changing the membership functions 31, tuner 14 incorporates self-monitoring processor 40, which compensates for system uncertainties by dynamically scaling the output of the tuner as a function of performance and performance history.

Figure 5:
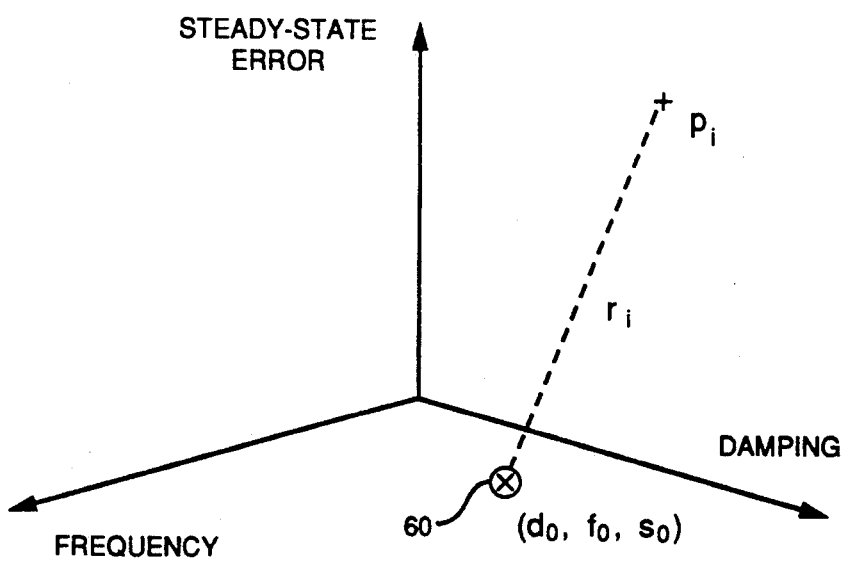
FIG. 5 is a plot of the three-dimensional state-space of the tuner of the present invention.

Self-monitoring processor 40 is used to scale the incremental gain value adjustments output by defuzzifier 36. Stated simply, processor 40 amplifies the gain adjustments when tuner 14 is effective and diminishes the gain adjustments when tuner 14 becomes ineffective. Self-monitoring is accomplished by successive evaluation of a function in the "state-space" of tuner 14. As described above, the state-space of tuner 14 comprises the three variables of damping ratio, frequency, and steady-state error. The state-space equilibrium point (d$_0$, f$_0$, s$_0$) 60 is defined as the desired values of the three state variables. FIG. 5 illustrates the 3-dimensional state-space, the equilibrium point 60 at (1, 0.5, 0), and a point p$_i$ located in the state-space at coordinates (d$_i$, f$_i$, s$_i$) a distance r$_i$ from equilibrium point 60. The objective of the self-monitoring mechanism of tuner 14 is to move the parameters (coordinates) of point p$_i$ toward equilibrium point 60.

Self-monitoring processor 40 computes a Lyapunov function in the state-space comprising the Euclidian distance r$_i$ between the current values of damping, frequency, and steady-state error and the equilibrium point 60. If the distance r$_i$ decreases between successive tuning cycles, tuner 14 is accomplishing its objective. However, because approximator 24 is estimating the state of system 12 from analysis of output response 20, factors such as noise and time-varying behavior of system 12 may produce an increase in r$_i$ even when tuner 14 is performing effectively. Therefore, self-monitoring processor 40 measures both "effectiveness" 42 and "consistency" 44 of tuner 14 to prevent tuner-induced gain changes based on transient anomalies such as noise spikes.

An estimate of tuner effectiveness 42 can be obtained from the incremental change in the distance (i.e., r$_{i-1}$ — r$_i$) toward equilibrium point 60 in the state-space of tuner 14. The magnitude of this incremental change in distance is a measure of the tuner's effectiveness in moving the output of system 12 toward equilibrium point 60. However, because this measure can fluctuate significantly between tuner cycles, the preferred measure of effectiveness 42 is computed as the difference between two successive distances to equilibrium point 60 (i.e., the incremental change) divided by a moving average of the incremental changes in the distance. Thus, effectiveness 42 provides a quantitative estimate of the performance of tuner 14 in the most recent tuning cycle as compared to the average of the preceding cycles. In addition to effectiveness, tuner consistency 44 is defined as the inverse of the variance of tuner effectiveness 42 over three tuning cycles. Consistency 44 is a measure of how uniformly tuner 14 has performed in the i$^{th}$ cycle as compared to the preceding two cycles.

Prior art tuners that have no capability for adapting membership functions or rules are limited in their applicability to the small classes of dynamic systems for which they are designed. On-line, real-time adaptation is required to extend a tuner's utility to a larger number of systems and to uncertainties in the systems. In the present invention, a reward factor calculator 46 computes a "reward factor" used for scaling the incremental gain adjustments before they are applied to controller 10. The reward factor is based on the measures of effectiveness 42 and consistency 44. In the preferred embodiment, a conservative reward factor scheme allows tuner 14 to effect only small changes to the gain values of controller 10 during a given tuner cycle.

The actual value of the reward factor computed by reward factor calculator 46 is determined by a set of rules based on the following three heuristics:

---

If consistency AND effectiveness are high, then reward factor is high.
If consistency AND effectiveness are med, then reward factor is med.
If consistency OR effectiveness is low, then reward factor is low.

---

Thus, the reward factor is high if tuner 14 consistently and effectively moves the output of system 12 toward equilibrium point 60. If effectiveness and consistency degrade, the reward factor is reduced. In the preferred embodiment, the reward factor ranges between 1 and 1.5.

The reward factor can be combined with effectiveness 42 to diminish the output of tuner 14 when it becomes ineffective or starts to degrade the output response 20. An effectiveness multiplier can be derived from effectiveness 42 by using fuzzy rules. For example, the multiplier can range from a value of zero, if effectiveness is consistently negative for three tuner cycles, to a value of 1.5, if effectiveness is consistently greater than unity. Thus, multiplier 50 scales the incremental gain adjustments received from defuzzifier 36 by multiplying them by the reward factor and the effectiveness multiplier to yield the final incremental gain value adjustments applied to controller 10. As should be apparent to those skilled in the art, alternative embodiments of the present invention may use separate reward factors for the individual gains, other valid measures of effectiveness and consistency, and other sets of if-then rules or heuristics.

The self-monitoring function of the present invention improves the performance as well as the robustness of tuner 14 by scaling the output to produce faster slew rates when performance is good and gracefully diminishing the output when performance is poor. If the effectiveness of tuner 14 becomes negative, it is likely that the controlled system is unstable. To provide for this contingency, the self-monitoring mechanism can be programmed to respond to detected unstable behavior by downloading a predetermined set of controller gain values that are known to provide a stable output response. Thus, tuner 14 is effective in controlling systems having large parametric and dynamic uncertainties by scaling its output in real-time based on a continuous reevaluation of its own performance.

A simulation of the performance of a PID controller has been run on MATLAB, a commercially available mathematical analysis package, with and without the self-monitoring function of tuner 14. Simulation was performed with a large number of widely disparate transfer functions. When simulating an unstable third order system, tuner 14 was able to stabilize the system by adding a significant amount of damping. However, without the self-monitoring function of the present invention, the system became unstable again after about ten tuning cycles. With the self-monitoring function in operation, the effectiveness of tuner 14 dropped to zero at the tenth tuning cycle and became negative thereafter. As a result, the effectiveness multiplier successfully limited the tuner output before the system became unstable again. This simulation demonstrates the need for a self-monitoring tuner to control systems with large parametric and dynamic uncertainties.

Although the present invention has been described with respect to a specific embodiment thereof, various changes and modifications may be suggested to one skilled in the art. Therefore, it is intended that the present invention encompass such changes and modifications as fall within the scope of the appended claims.

I claim:

1. A method of feedback control, comprising the steps of:
   connecting a feedback controller to a controlled system for receiving an input signal, providing a gain signal to said controlled system, and receiving a response signal from said controlled system;
   connecting a tuner to said controller for comparing said input signal with said system response signal and for applying incremental gain value adjustments to said controller;
   converting selected parameters of said compared signals to fuzzy logic parameters;
   applying if-then rules to said fuzzy logic parameters for computing said incremental gain value adjustments;
   measuring effectiveness and consistency of previously applied gain value adjustments;
   scaling said computed incremental gain value adjustments based on said measured effectiveness and consistency; and
   applying said scaled incremental gain value adjustments to said controller.

2. The method of claim 1, wherein the step of converting selected parameters further comprises the steps of:
   computing parameters of system damping, frequency, and steady-state error; and
   transforming said parameters of system damping, frequency, and steady-state error to corresponding fuzzy membership functions.

3. The method of claim 2, wherein the step of measuring effectiveness and consistency further comprises the steps of:
   defining a system state-space having coordinates of damping, frequency, and steady-state error;
   mapping said computed parameters of system damping, frequency, and steady-state error into said state-space;
   defining an equilibrium point in said state-space comprising desired values of system damping, frequency, and steady-state error;
   measuring a distance between said mapped parameters and said equilibrium point in said state-space;
   computing effectiveness as a difference between two successive measurements of said distance divided by a moving average of said differences; and
   computing consistency as an inverse of variance of tuner effectiveness over three successive computations of effectiveness.

4. The method of claim 3, wherein the step of scaling said computed incremental gain value adjustments further comprises the steps of:
- defining a reward factor as a function of effectiveness and consistency;
- defining an effectiveness multiplier as a function of effectiveness; and
- multiplying said computed incremental gain value adjustments by said reward factor and said effectiveness multiplier.

5. A method of adjusting gain of signals provided to a controlled system by a feedback controller, comprising the steps of:
- comparing a system input signal with a response of the controlled system;
- transforming system parameters of damping, frequency, and steady-state error to fuzzy logic membership functions;
- computing gain value adjustments by applying if-then rules to said fuzzy logic membership functions;
- measuring effectiveness and consistency of previously applied gain value adjustments;
- scaling said computed gain value adjustments based on said measurements of effectiveness and consistency; and
- applying said scaled gain value adjustments to the feedback controller.

6. The method of claim 5, wherein the step of measuring effectiveness and consistency further comprises the steps of:
- defining a system state-space having coordinates of damping, frequency, and steady-state error;
- mapping said system parameters of damping, frequency, and steady-state error into said state-space;
- defining an equilibrium point in said state-space comprising desired values of system damping, frequency, and steady-state error;
- measuring a Euclidian distance between said mapped parameters and said equilibrium point in said state-space;
- computing effectiveness as a difference between two successive measurements of said Euclidian distance divided by a moving average of said differences; and
- computing consistency as an inverse of variance of effectiveness over three successive computations of effectiveness.

7. The method of claim 6, wherein the step of scaling said gain value adjustments further comprises the steps of:
- computing a reward factor as a function of effectiveness and consistency;
- computing an effectiveness multiplier as a function of effectiveness; and
- multiplying said computed gain value adjustments by said reward factor and said effectiveness multiplier.

8. A tuner for applying incremental gain value adjustments to a proportional, integral, and derivative controller, comprising:
- means for comparing an input signal with a response of a system controlled by the controller;
- means for transforming system parameters of damping, frequency, and steady-state error to fuzzy membership functions;
- means for computing the incremental gain value adjustments by applying if-then rules to said fuzzy membership functions;
- means for measuring effectiveness and consistency of previously applied incremental gain value adjustments;
- means for scaling said computed incremental gain value adjustments based on said measurements of effectiveness and consistency; and
- means for applying said scaled incremental gain value adjustments to said controller.

9. The tuner of claim 8, wherein the means for measuring effectiveness and consistency further comprises:
- a system state-space defined with coordinates of damping, frequency, and steady-state error;
- system parameters of damping, frequency, and steady-state error mapped into said state-space;
- an equilibrium point comprising desired values of system damping, frequency, and steady-state error defined in said state-space;
- a Euclidian distance measured between said mapped parameters and said equilibrium point in said state-space;
- means for computing effectiveness as a difference between two successive measurements of said Euclidian distance divided by a moving average of said differences; and
- means for computing consistency as an inverse of variance of effectiveness over three successive computations of effectiveness.

10. The tuner of claim 9, wherein the means for scaling said gain value adjustments further comprises:
- means for computing a reward factor as a function of effectiveness and consistency;
- means for computing an effectiveness multiplier as a function of effectiveness; and
- means for multiplying said computed gain value adjustments by said reward factor and said effectiveness multiplier.

* * * * *